E. HOPKINSON.
METHOD OF MAKING CASINGS OF PNEUMATIC TIRES FOR VEHICLES.
APPLICATION FILED JAN. 18, 1918.

1,289,767.

Patented Dec. 31, 1918.
4 SHEETS—SHEET 1.

Inventor
Ernest Hopkinson

Inventor
Ernest Hopkinson

E. HOPKINSON.
METHOD OF MAKING CASINGS OF PNEUMATIC TIRES FOR VEHICLES.
APPLICATION FILED JAN. 18, 1918.
1,289,767.
Patented Dec. 31, 1918.
4 SHEETS—SHEET 3.
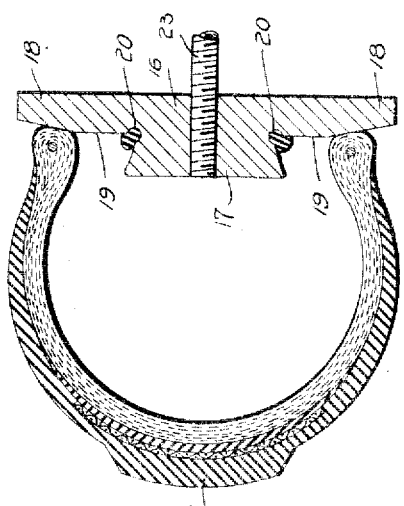
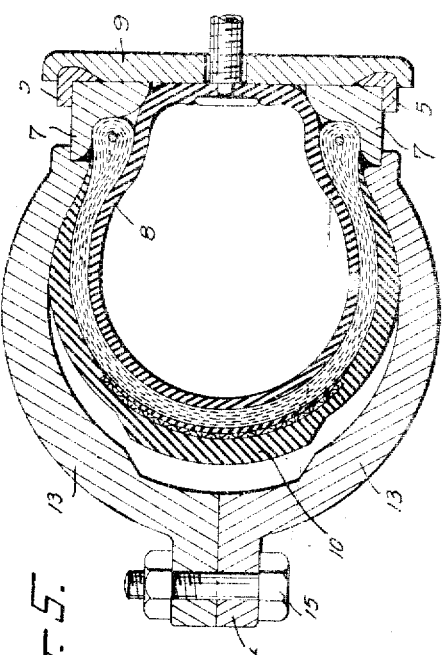
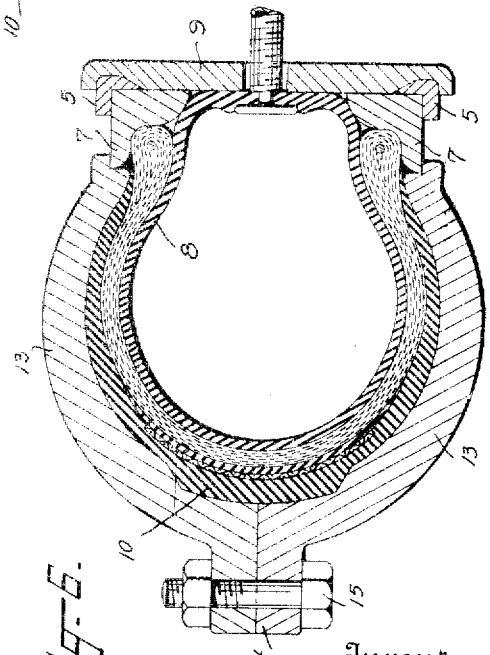
Inventor
Ernest Hopkinson E. HOPKINSON.
METHOD OF MAKING CASINGS OF PNEUMATIC TIRES FOR VEHICLES.
APPLICATION FILED JAN. 18, 1918.

1,289,767.

Patented Dec. 31, 1918.
4 SHEETS—SHEET 4.

Inventor
Ernest Hopkinson

UNITED STATES PATENT OFFICE.

ERNEST HOPKINSON, OF NEW YORK, N. Y.

METHOD OF MAKING CASINGS OF PNEUMATIC TIRES FOR VEHICLES.

1,289,767.

Specification of Letters Patent.  Patented Dec. 31, 1918.

Application filed January 18, 1918. Serial No. 212,517.

*To all whom it may concern:*

Be it known that I, ERNEST HOPKINSON, a citizen of the United States, residing in New York city, county of New York, and State of New York, have invented a certain new and useful Method of Making Casings of Pneumatic Tires for Vehicles, of which the following is a full, clear, and exact description.

The present invention has for its object to provide a new method of making casings for pneumatic tires for motor-driven vehicles and has particular reference to the vulcanizing process. In describing this method certain apparatus will be described but such apparatus is not claimed in this application but reserved to be made subject of other applications.

The invention has particular reference to the casings of pneumatic tires for motor-driven vehicles built and formed in the manner set forth in another application filed by me, Serial No. 140,508, but it will be understood that the invention of this application is applicable to casings made by other methods.

In the manufacture of casings for pneumatic tires for motor vehicles the method in common usage is to build the casing on a metal ring core having substantially the cross-sectional shape of the cavity of the casing when finished. The casing with the inclosed core is then placed within outer confining means, such as metal mold members or a canvas wrapping, and subjected to the heat of vulcanization. In another method, the casing, having been made on the core, is taken off the core, mounted on a rim and vulcanized either wholly or partially while subjected to internal pressure exerted through the medium of a rubber tube or air-bag to cause the casing to be stretched slightly and expanded and pressed against the inner surface of the outer mold members. In this process the rubber tube or air-bag can only withstand comparatively few vulcanizing heats, and, being quite expensive, adds materially to the cost of the vulcanizing process.

In the method of vulcanization in which the casing is pressed tightly between the outer surface of a metal core and the inner surface of the mold members, there is no stretching or straightening of the threads of the casing, which straightening is extremely desirable, and it is essential that the unvulcanized tires shall be built with the utmost nicety in order to properly fit the space between the outer surface of the core and the inner surface of the mold members.

The object of my invention is to obtain the advantages of stretching or straightening the threads of the casing without the employment of any tube or air-bag construction during the vulcanizing process, so that the cost resulting from the destruction of such tubes or air-bags shall be eliminated, and also to avoid the use of the core in any such manner as shall require the nicety of fit necessary where the casing fills the space between the outer surface of the core and the inner surface of the outer mold member.

I will describe the invention as carried out on a tire casing built in flat pulley-band form as described in my said application and in connection with one form of apparatus which I have found particularly efficient.

In the drawings accompanying the present application Figure 1 is a view partly in cross-section and partly in side elevation of a hollow pulley designed to be steam-heated and used for the purpose of warming the pulley-band carcass prior to forming the same to tire shape.

Fig. 3 is a fragmentary view partly in side elevation and partly in cross-section of a portion of the machine for forming the pulley-band casing into tire shape, which apparatus is fully described in my application above referred to.

Fig. 5 is a view in cross-section showing the parts illustrated in Fig. 4 and associated with outer confining means.

Fig. 6 is a view similar to Fig. 5 but showing the tire casing expanded into contact with the inner surface of the outer confining means.

Fig. 7 is a view in cross-section showing the tire dissociated from the parts shown in Figs. 5 and 6 and illustrating its association with the bull-ring closure which is used in the final vulcanization.

In the various figures of the drawings like numerals of reference refer to like parts.

Figure 1:
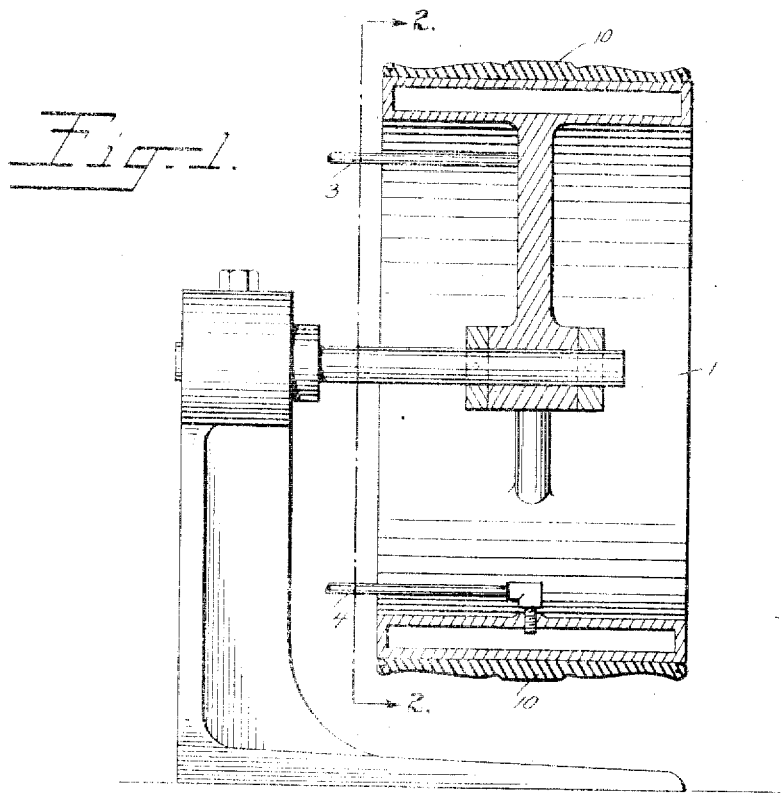

Referring to these drawings in detail: Fig. 1 illustrates a pulley comprising a section 1 and a hinged portion 2 both of which are made hollow and are independently supplied with a heating medium, such as steam, inlet tubes 3 and outlet tubes 4 being provided for the circulation of the steam through the hollow sections.

After a casing has been built in pulley-band form in the manner set forth in my application above referred to, it is preferably placed on this warming pulley, the hinged portion 2 being provided to permit of the pulley-band being easily applied and removed. Preferably the inner ply of fabric will have a skim coat of rubber about .005 of an inch thick on its inner surface. While it is not absolutely essential to warm the pulley-band casing, it is highly desirable, as the effect of the warming operation is to soften the rubber between the various plies of the fabric and permit the threads to more easily move relatively to each other during the subsequent forming operation. Further, this warming operation permits the pressure of the inner tube used in the subsequent forming of the tire to more readily exercise its function of expanding the casing and at the same time forming it to substantially the desired size of the finished casing. While in this description I refer to a tire casing built complete with the cushion stock, breaker strip and tread applied, it will be understood that the expanding, forming and setting operation may be used in connection with the carcass only if desired.

Figure 3:
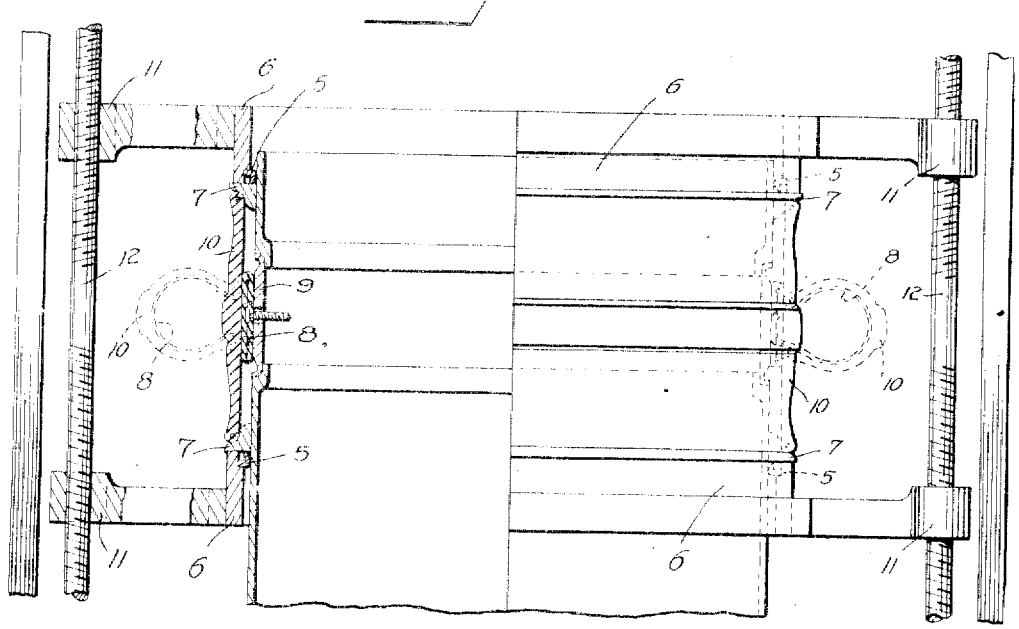

After the pulley-band casing has been warmed for a sufficient length of time (and I may say that I have found the pulley-band casing left on the heated pulley for one-half hour under the heat produced by a steam pressure of five pounds to the square inch is sufficient), the pulley-band casing is removed from the warming ring and formed into tire shape by apparatus such, for instance, as that illustrated in Fig. 3 which is fully described in my said application above mentioned. For the purposes of this application it will be sufficient to say with regard to this part of the process that the lower locking ring 5 is placed in the groove in the ring 6 and then an endless ring 7 is placed on top of the ring 6. The collapsed rubber tube 8 is then placed in position on the rim 9. The pulley-band casing 10, while warm and as soon as possible after being taken from the warming ring, is placed in the position illustrated in full lines in cross-section in Fig. 3. Then the upper of the two rings 7 and the upper locking ring 5 are placed in position. The rubber tube 8 is then inflated simultaneously with the movement of the rings 11 toward each other, which results from the turning of the right and left hand threaded rods 12. This operation causes the pulley-band casing to be lifted along its central line and its edges moved toward each other until the parts are in the position shown in dotted lines in Fig. 3 and in cross-section on an enlarged scale in Fig. 4, in which latter view the locking rings 5 are shown in their locking position in circumferential recesses in the rim 9. Referring to this Fig. 4, it will be understood that the inner tube 8 contains air under pressure, but not under sufficient pressure to cause the casing to be distended to full size and shape.

Figure 4:
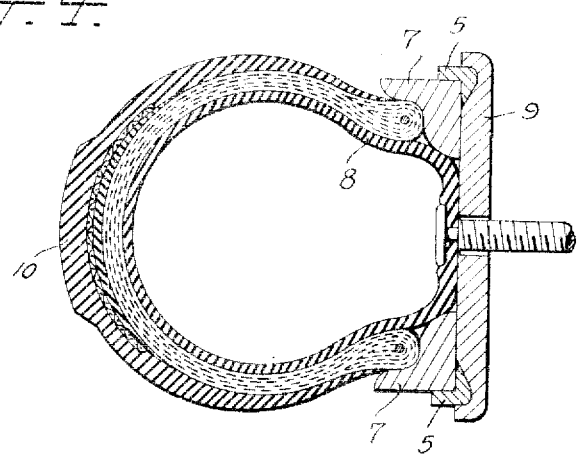
Fig. 4 is a view in cross-section of the unvulcanized casing and associated parts after the same have been removed from the apparatus shown in Fig. 3.

The next step in the process is to place the tire mounted on the rim as illustrated in Fig. 4 in setting devices which limit the amount of expansion of the tire and roughly define its final shape. An ordinary mold specially designed for this purpose may be used, but I prefer to use comparatively light members such as those illustrated in Fig. 5, which consist of two circumferential members 13, each provided with peripheral flanges 14 secured in any desired manner, as by bolts 15. These members 13 may be of comparatively rough and light construction, such as stamped steel shells which preferably define a space as large or slightly larger than the desired size of the casing when finished, and their function is to limit the expansion of the tire and afford some backing against which the internal pressure of the tube 8 may be exerted to compact the wall of the casing and, as it expands, set it at substantially the size and shape desired in the finished casing.

Figure 2:
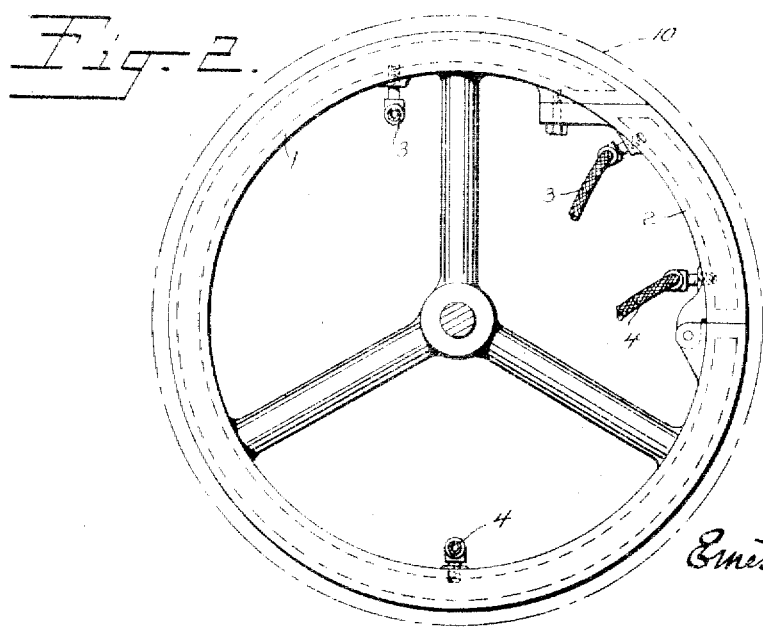
Fig. 2 is a view taken along line 2—2 of Fig. 1, looking in the direction of the arrow.

It is desirable, and very much preferable, that the sequence of operations just described shall be carried out as promptly as possible after the casing has been warmed on the warming ring illustrated in Figs. 1 and 2. Of course, the pulley-band casing begins to cool after being taken off the warming ring and the forming and expanding operations are much more easily accomplished while the casing is warm than after it has cooled; and, in fact, the main object of warming the casing is to effect the change of form from pulley-band shape to tire shape while the casing is warm so that as little strain as possible will be placed on the threads of the carcass in their movement relatively to each other which is necessarily involved in the change of shape. It is also desirable that the fluid pressure contained in the tube 8 shall distend the casing into contact with the inner surface of the members 13 as promptly as may be, as the compacting effect is more efficient if exerted while the casing is warm.

As has been stated before, the inner tube 8 preferably does not have its maximum pressure when taken off the forming apparatus illustrated in Fig. 3, so that when the members 13 are associated with the casing the casing does not fill the cavity defined by these members. Immediately these members 13 have been placed in position full pressure is given to the inner tube (about 150 pounds to the square inch) and the casing is placed to one side where the internal pressure gradually expands the casing to fill the cavity defined by the members 13 and acts to compress the casing against the inner surface of said members, the assemblage being left until the casing has cooled. In this manner the expansion of the casing to substantially the desired size and shape has taken place without subjecting the inner tube to any vulcanizing heat, the heat of the casing resulting from its previous warming, so far as concerns any deteriorating effect on the inner tube, being negligible. In Fig. 6 I have shown the casing expanded to full size within the members 13.

After the casing has cooled down it is dismounted from the rim 9 and the inner tube withdrawn. Upon the withdrawal of the tube the casing will contract slightly, but very slightly, as the effect of holding it under pressure after it has been warmed and during the process of cooling down has been to set all the parts relative to each other at substantially the desired size and shape. It will be understood, however, that the desired configuration is given to the tread in the final vulcanization.

I am aware that it has heretofore been proposed to vulcanize a tire casing by using an internal fluid pressure in direct contact with the inner surface of the casing, but such efforts have failed because the fluid has been required to initially stretch the threads or expand the fabric of the casing while the casing is in unvulcanized condition. When this is attempted the resistance of the rubber between the threads of the carcass is less than the resistance of the threads themselves and it results that the fluid pressure enters the body of the casing through the interstices of the fabric and causes a spongy or "blown" condition of the casing when finally vulcanized. But I have discovered that if the threads of the casing are stretched by an expansible member, such as a rubber tube or air-bag, to substantially the desired size of the finished product much of the tension and resistance of the threads is taken out, and, if the casing is held in this condition for a proper period of time the expansible member will compress or compact the layers of fabric and cause the rubber to enter all the interstices of the fabric and act to seal the same and set the casing at the desired final size, so that when the expansible member is withdrawn and fluid under pressure introduced in direct contact with the casing for the final vulcanizing operation, the casing will readily go back to the size at which it has been set without disturbing the sealing effect of the intervening rubber, and there will be no penetration of the gas, nor separation of the threads, nor of the plies of fabric of the carcass, nor any spongy character of the casing which would result if the fluid had been introduced to produce the initial straightening of the threads or expansion of the casing without any preliminary setting process.

After the casing has been dissociated from the parts shown in Figs. 5 and 6 it is ready for the final vulcanizing operation, which may now be effected without the use of any solid core or mandrel or any expansible member, such as a rubber tube or airbag. In this final vulcanizing operation the casing is sealed by bridging its edges by a suitable member, such as that illustrated in Fig. 7, or those illustrated in Fig. 9. Referring to Fig. 7, 16 designates a desired form of closure for the edges of the casing which closing member may be called a flanged bull-ring, and consists of an annular portion 17 extending radially outward and filling the space between the two edges of the casing. On each side of this central portion there is a flange 18 having a portion of its inclined to permit of the easy application of the casing, and a straight portion 19 on which the edges of the casing rest during the vulcanizing operation, it being understood that the diameter of the ring 16 at the portions 19 is such as to effect a compression of the fabric of the casing under the side wires and define the diameter of the casing relatively to the rim with which it is designed to be used when vulcanized. This ring 16 is preferably provided with circumferential grooves 20 in the corners formed by the meeting of the surface 19 with the sides of the radially projecting portion 17. Before the ring 16 is associated with the tire casing a packing of plastic material, preferably unvulcanized rubber, is placed in position in each of the grooves 20, the packing being of such cross-sectional size that a substantial portion projects beyond the groove to form a seal between the ring 16 and the edges of the casing. When the casing has been associated with the ring 16 in the position shown in Fig. 7, the edges of the casing are pushed up the inclined surfaces onto the flat portions 19 in any desired manner, suitable factory appliances being provided for this purpose.

Figure 8:
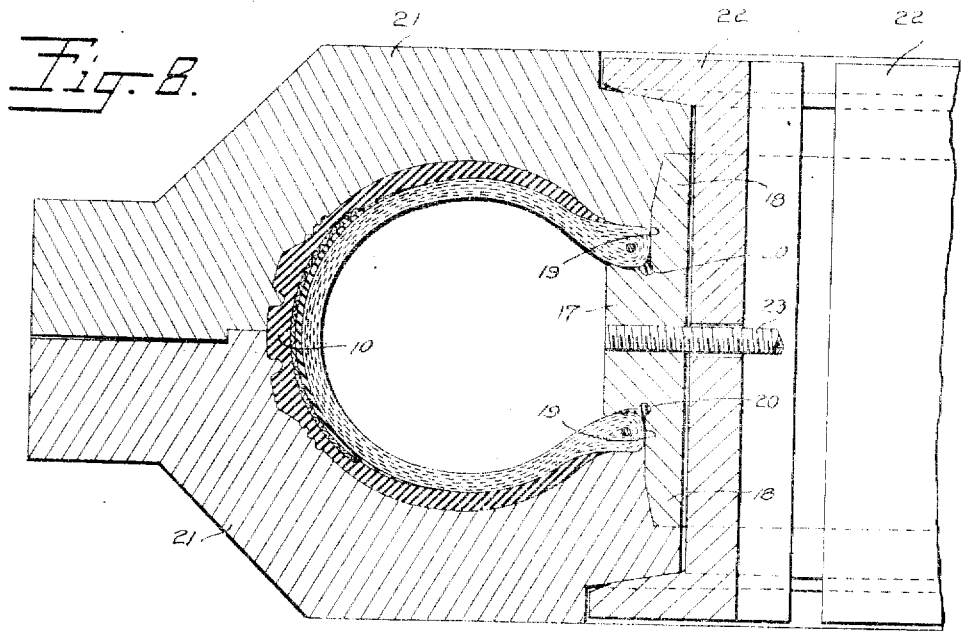
Fig. 8 is a view in cross-section showing the casing associated with the parts used in the final vulcanizing operation.
Figure 9:
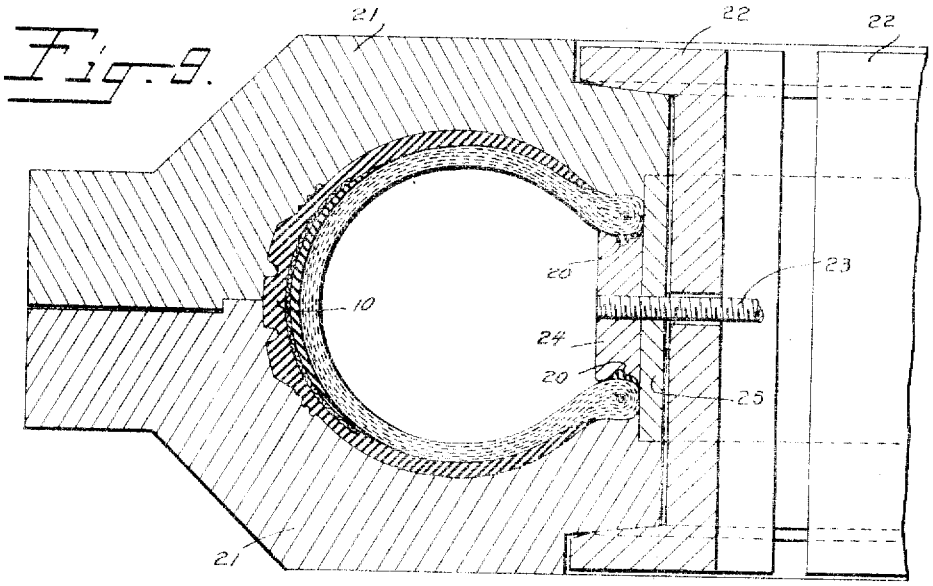
Fig. 9 is a view similar to Fig. 8 but showing a modified form of bull-ring.

The ring 16 carrying the casing thereon is then placed in the lower of the two mold members 21. The upper mold member is then placed in position and this assemblage placed in a hydraulic press which is caused to press the two mold members together thus pressing the edges of the casing against the sides of the radially projecting portion 17 of the ring 16, squeezing the excess of rubber in the groove 20 outward and under the edges of the casing in order to produce an extended seal. While these parts are held under the hydraulic press arc clamps 22 are placed in position, as illustrated in Figs. 8 and 9, for the purpose of maintaining the assemblage of parts in the relative positions they are caused to assume by the action of the hydraulic press. While the parts are held together by the hydraulic press, or after the clamps have been applied and the mold removed from the press, I introduce $CO_2$ until a pressure of about 150 pounds to the square inch is attained in the cavity of the casing. This pressure is introduced through the tube 23 which is provided with any suitable valve device for confining the internal fluid, which valve device I have not shown in the drawings. After the sector clamps 22 have been placed in position and the fluid introduced into the cavity of the casing under pressure, the mold with the contained casing is placed in a suitable vulcanizer and subjected to the heat of vulcanization by any desired means. Preferably the molds will be placed on top of each other on the ram of the ordinary hydraulic press vulcanizer. In Fig. 9 I have illustrated a modified form of sealing device comprising an endless ring 24 and a broken ring 25, which is expanded by means of a wedge-piece to fit within the inner surface of the ring 24 and expand the edges of the tire. I have not illustrated the wedge-piece in the drawing but this description will be sufficient to enable one skilled in the art to understand the method which is the subject of this application.

In the drawings I have shown a tire casing having inextensible wires embedded in its edges and provided with straight side walls, and have illustrated apparatus suitable for use in the manufacture of such a tire casing. It will be understood, however, that the invention is equally applicable to clencher or Q. D. casing with appropriate modification of the form of the apparatus used, and it will also be apparent that the invention may be availed of in the vulcanizing of tire casings made by any of the methods now practised which involve the building of the tire on a metal core. I have also emphasized the desirability of the preliminary warming step, but this step may be dispensed with if the time of holding the tire casing under internal pressure at substantially the desired size of the finished product is materially extended. If the tire casing is not given a preliminary warming process the period during which it is held under internal pressure is very much extended, whereas, if a preliminary warming process is given to the casing, it need not be kept under pressure any longer than is necessary to completely cool it.

The process is applicable to casings made of thread fabric, or what are commonly known as cord tires, as well as to casings which are made of square woven fabric. In the latter case the ends of the pieces of fabric making up each ply are lapped farther than usual in order to permit of the slip which takes place during the forming operation.

I prefer to use $CO_2$ as the fluid pressure-producing medium in the final vulcanizing operation, as this gas has no deteriorating effect on the rubber, but it will be understood that any other fluid may be used which is inert so far as concerns its action on the rubber and fabric of the tire.

It will be appreciated by any one skilled in the art that the invention of the present application has very important advantages. For instance, compared with the process of vulcanizing with an internal metal core, the great cost and upkeep of cores is eliminated as well as the increased labor necessary to their handling. Again, when tire casings are vulcanized between an inner core and outer mold members, it is practically impossible to make any variation in the thickness or relative proportions of the different parts of the tire casing without requiring new core or mold equipment; whereas, with the present method a wide latitude is permissible. Comparing processes of vulcanization involving the use of an internal tube or air-bag during the vulcanizing process, the expense due to the destruction of the inner tubes or air-bags as a result of their being subjected to the deteriorating effect of the heat of repeated vulcanization operations is entirely avoided. Further, in many processes now in use, whether involving the use of an inner core or an expansible rubber tube or air-bag, it is the common practice to divide the vulcanizing process by giving the carcass or tread, or both, a preliminary partial vulcanization and then uniting the carcass and tread in a final vulcanization process. Such a process consumes a long period of time in the heating and cooling necessary and requires a large equipment of carcass molds, finishing molds, and permanent plant equipment in the shape of vulcanizer presses; whereas, in my process, the casing is vulcanized at a single operation and the number of vulcanizing molds, cores, and vulcanizer presses very much reduced. Also, the time consumed in the vulcanizing operations is very much diminished.

Of course, a substantial measure of the advantages of the invention may be obtained by subjecting the casing to the action of the expansible member while the casing is inclosed within outer mold members within a heated vulcanizing chamber for a short initial period of time to thoroughly warm the casing, even though the necessary result is a slight vulcanizing effect on the casing and has a corresponding deteriorating effect on the expansible member; and certain of the claims are intended to be of such scope as to cover such a use, because in such a method it would still be possible to avail of that portion of the invention by which the necessity for using a rubber tube, or air-bag throughout the major part of the vulcanizing period would be avoided.

It is obvious, if the cords composing the carcass of the casing are not under the required stretch and disposed in the paths of greatest efficiency at the time the casing is vulcanized, that the pressure upon the casing when in service will subject the cords or fabric to undue and useless strains, which will in time result in separating the cords, threads, etc., from the rubber component and at the same time breaking them, thus soon rendering the tire useless. It is therefore the object of this invention to give the proper stretch and position to the cords prior to vulcanization, and while it is quite immaterial in what manner (whether in the form of an endless ring such as a flat pulley band or the usual form of a casing built on a core) the several parts composing the tire are originally assembled, it is essential that the cross sectional area of the cavity of the casing at the completion of the building operation shall be smaller than the finished tire. This is necessary in order that sufficient latitude may be given for the shaping and stretching steps of my process necessary to produce the desired results above mentioned.

While all of the expanding and stretching of the casing and the formation of the tread and other surface configurations need not be produced by means of the expansible member, it is at least essential that substantially all of the expanding and stretching of the threads or fabric of the carcass be produced by this member, the directly applied fluid pressure being principally used for supporting the casing during vulcanization. This directly applied pressure may however, be relied upon, and in my preferred embodiment is relied upon, for coöperating with the outer mold walls for producing the tread and other surface configurations of the rubber, and may in fact produce a small amount of expansion and stretch of the casing provided this is within the limits where no deleterious results will follow, such as penetration of the wall of the casing by the fluid. When therefore I refer in the claims to the use of an expansible member and the subsequent use of the fluid pressure directly applied it is to be understood that substantially all of the expanding and stretching is produced by the expansible member.

What I claim and desire to secure by Letters Patent of the United States is:—

1. The method of making a pneumatic tire casing comprising the steps of stretching the threads of the formed casing by means of an expansible member applied to the interior of the casing until substantially tire size and shape is attained, holding them under stretched condition by means of said expansible member until set and afterward vulcanizing the casing under the pressure of a fluid in direct contact with the inner surface of the casing.

2. The method of making a pneumatic tire casing which comprises building the casing, expanding and holding the same at a desired size in excess of building size at ordinary temperatures under the pressure of an internal expansible member until substantially tire size is attained, removing the expansible member, sealing the edges of the casing to form a fluid-tight cavity within the casing, admitting fluid pressure to said cavity to support the casing at tire size, and completing the casing by vulcanization while acted upon by the directly applied fluid.

3. The method of making a pneumatic tire casing which comprises forming the casing of smaller cross-sectional size than the desired size of the finished casing, expanding the casing while unvulcanized to substantially the final size by means of an expansible member while confining the edges of the casing, and holding the same under pressure in unvulcanized condition until it has set at substantially the desired size of the casing when finished, removing the expansible member, sealing the edges of the casing, and finally vulcanizing the casing under the pressure of a fluid in contact with the inner surface of the casing.

4. In the method of making a pneumatic tire casing, the steps of building the casing with its central portion of a smaller diameter than the finished casing, expanding the casing by the internal pressure of an expansible member to substantially the desired size of the casing when finished, holding the casing as thus expanded until the tire is set, removing the expansible member and vulcanizing the casing within outer confining means under the internal pressure of a fluid in direct contact with the inner surface of the casing.

5. In the method of making a pneumatic tire casing, the steps of assembling a plurality of plies of rubber and fibrous material to form an endless ring having its central portion of smaller diameter than the finished tire, subjecting said portion to the action of the pressure of a fluid indirectly applied to the interior thereof until substantially final tire shape and size is attained, subsequently thereto subjecting the said portion to the action of the pressure of a fluid in direct contact with the interior thereof, and finally vulcanizing the casing while acted upon by the directly applied fluid.

6. In the method of making a pneumatic tire casing, the steps of first building the casing in pulley-band shape, expanding the pulley-band to substantially tire size and shape, holding the casing thus formed under the internal pressure of an expansible member, removing the expansible member and vulcanizing the casing within outer confining means under the internal pressure of a fluid in direct contact with the inner surface of the casing.

7. In the method of making a pneumatic tire casing, the steps of first building the tire casing in pulley-band shape, warming the same, expanding the pulley band to substantially tire shape and size holding the casing under the internal pressure of an expansible member at substantially the desired size of the casing when finished until the casing is set, removing the expansible member and vulcanizing the casing within outer confining means under the internal pressure of a fluid in direct contact with the inner surface of the casing.

8. In the method of making a pneumatic tire casing, the steps of building the casing in pulley-band shape, expanding the pulley-band to substantially tire shape and size, holding the same under the internal pressure of an expansible member at substantially the desired size of the casing when finished, removing the expansible member, sealing the edges of the casing and vulcanizing the casing within outer confining means under the internal pressure of fluid in contact with the inner surface of the casing.

9. In the method of making a pneumatic tire casing, the steps of building the casing with its central portion of a smaller diameter than the finished casing, expanding the unvulcanized casing within outer confining means to substantially the desired size and shape of the finished casing under the internal pressure of an expansible member, holding the casing as thus expanded while maintaining the unvulcanized condition until the casing is set, removing the expansible member, and vulcanizing the casing within outer confining means under the internal pressure of a fluid in direct contact with the inner surface of the casing.

10. In the method of making a pneumatic tire casing, the steps of building the casing in pulley-band shape, expanding the pulley-band to substantially tire shape and size, holding the casing within outer confining means under the internal pressure of an expansible member at substantially the desired size of the finished casing until the casing is set, removing the expansible member and vulcanizing the casing within outer confining means under the internal pressure of a fluid in direct contact with the inner surface of the casing.

11. In the method of making a pneumatic tire casing, the steps of building the casing with its central portion of a smaller diameter than the finished casing, expanding the unvulcanized casing to substantially the desired size of the finished casing under the internal pressure of an expansible member, holding the casing as thus expanded while maintaining the unvulcanized condition until the casing is set, removing the expansible member, placing a sealing member between the edges of the casing and placing the casing and the sealing member between outer mold members, clamping the edges of the casing against the sides of the sealing member, and vulcanizing the casing under the internal pressure of a fluid in contact with the inner surface of the casing.

12. In the method of making a pneumatic tire casing, the steps of building the casing with its central portion of a smaller diameter than the finished casing, expanding the unvulcanized casing to substantially the desired size of the finished casing within outer confining members under the internal pressure of an expansible member, holding the casing as thus expanded while maintaining the unvulcanized condition until the casing is set, removing the outer confining means, and expansible member, placing a sealing member between the edges of the casing and placing the casing and the sealing member between outer mold members, clamping the edges of the casing against the sides of the sealing member and vulcanizing the casing under the internal pressure of a fluid in contact with the inner surface of the casing.

13. In the method of making a pneumatic tire casing, the steps of building the casing in pulley-band shape, expanding the pulley-band to substantially final tire shape and size, holding the unvulcanized casing at substantially the desired size of the finished casing under the internal pressure of an expansible member within outer confining means while maintaining the unvulcanized condition until the casing is set, removing the outer confining means, and expansible member, placing a sealing member between the edges of the casing, and placing the casing and the sealing member between outer mold members, clamping the edges of the casing against the sides of the sealing member and vulcanizing the casing under the internal pressure of a fluid in contact with the inner surface of the casing.

14. In the method of making a pneumatic tire casing, the steps of building the casing with its central portion of a smaller diameter than the finished casing, warming and stretching the unvulcanized casing to substantially the desired size of the casing when finished under the internal pressure of fluid contained in an elastically expansible member, holding the casing as thus expanded while maintaining the unvulcanized condition until the casing is set, removing the expansible member, placing a sealing member between the edges of the casing and then placing the casing with the sealing member within outer mold members, clamping the edges of the casing against the sides of the sealing member and vulcanizing the casing under the internal pressure of a fluid in direct contact with the inner surface of the casing.

15. In the method of making a pneumatic tire casing, the steps of building the casing in pulley-band form, warming the same, expanding the pulley-band into tire shape and holding the unvulcanized casing at substantially the desired size of the finished casing within outer confining means under the internal pressure of an expansible member while maintaining the unvulcanized condition until the casing is set, removing the outer confining means and expansible member, placing a sealing member between the edges of the casing and then placing the casing with the sealing member within outer mold members, clamping the edges of the casing against the sides of the sealing member and vulcanizing the casing under the internal pressure of a fluid in direct contact with the inner surface of the casing.

16. The method of making a pneumatic tire casing which comprises the steps of assembling a plurality of plies of rubber and fibrous material to form an endless ring having its central portion of smaller diameter than the finished tire, expanding the said portion to substantially final tire size while maintaining the interior wall free from directly applied fluid pressure, subsequently thereto subjecting the interior to the action of the pressure of a fluid in direct contact with the inner surface of the casing, and finally vulcanizing the casing while acted upon by the directly applied fluid.

17. The method of making a pneumatic tire casing which comprises building the casing, subjecting the casing from the interior thereof to the pressure of fluid contained in an elastically expansible member until substantially final tire size is attained, subsequently thereto subjecting the casing to the pressure of a fluid in direct contact with the interior thereof, and finally vulcanizing the casing while acted upon by the directly applied fluid.

18. The method of making a pneumatic tire casing which comprises the steps of assembling a plurality of plies of rubber and fibrous material in flat pulley band form, subjecting the band to the expanding action of fluid contained in an expansible member until substantially final tire size is attained, subsequently thereto subjecting the casing to the pressure of a fluid in direct contact with the interior thereof, and finally vulcanizing the casing while acted upon by the directly applied fluid.

19. The method of making a pneumatic tire casing which comprises the steps of assembling a plurality of plies of rubber and fibrous material in flat pulley band form, subjecting the band to the expanding action of fluid contained in an expansible member until a partially formed casing is attained, inclosing the casing within outer confining walls, farther extending the casing by means of said expansible member against said confining walls until substantially tire size is attained, subsequently thereto subjecting the casing to the pressure of a fluid in direct contact with the interior thereof, and finally vulcanizing the casing while acted upon by the directly applied fluid.

20. The method of making a pneumatic tire casing which comprises the steps of assembling a plurality of plies of rubber and fibrous material to form an endless ring having its central portion of smaller diameter than the finished tire, expanding the said portion to substantially final tire size while maintaining the interior wall free from directly applied fluid pressure, subsequently thereto subjecting the interior to the pressure of a fluid in direct contact with the inner surface of the casing, subjecting the edges of the casing to a compacting and shaping pressure by inner and outer confining walls, and finally vulcanizing the casing while acted upon by the directly applied fluid.

21. The method of making a pneumatic tire casing which comprises the steps of assembling a plurality of plies of rubber and fibrous material to form an endless ring having its central portion of smaller diameter than the finished tire, expanding the said portion to substantially final tire size while maintaining the interior wall free from directly applied fluid pressure within outer confining walls having comparatively smooth interior surfaces, subsequently thereto placing the casing in outer confining walls having engraved interior surfaces for producing the tread and other surface configurations on the casing and subjecting the interior to the pressure of a fluid in direct contact with the inner surface of the casing, and finally vulcanizing the casing while acted upon by directly applied fluid.

Signed at New York city, New York, the 17th day of January, 1918.

ERNEST HOPKINSON.